United States Patent [19]

Schulz

[11] Patent Number: 4,866,320
[45] Date of Patent: Sep. 12, 1989

[54] FAN ASSEMBLY

[75] Inventor: Joachim Schulz, Amorbach, Fed. Rep. of Germany

[73] Assignee: AURORA Konrad G. Schulz GmbH & Co., Mudau/Odenwald, Fed. Rep. of Germany

[21] Appl. No.: 236,982

[22] Filed: Aug. 26, 1988

[30] Foreign Application Priority Data

Aug. 26, 1987 [DE] Fed. Rep. of Germany ....... 3728484

[51] Int. Cl.⁴ .............................................. H02K 5/00
[52] U.S. Cl. ...................................... 310/89; 310/59; 310/60 A; 310/63; 310/227
[58] Field of Search .............. 310/58, 59, 60 R, 60 A, 310/62, 63, 227, 89

[56] References Cited

U.S. PATENT DOCUMENTS

| | | |
|---|---|---|
| 3,648,086 | 3/1972 | Renner et al. ....................... 310/227 |
| 3,891,355 | 6/1975 | Hecht et al. .......................... 310/63 |
| 4,120,616 | 10/1978 | Dwyer et al. ......................... 310/63 |
| 4,742,257 | 5/1988 | Carpenter ............................. 310/63 |

Primary Examiner—William H. Beha, Jr.
Assistant Examiner—Anita M. Ault
Attorney, Agent, or Firm—Becker & Becker, Inc.

[57] ABSTRACT

A fan assembly that includes an impeller driven by an electric motor. The housing for the impeller has an air intake opening and a pressure-side connection for the discharge of air, with the pressure-side connection being provided with an air inlet opening that communicates with an air conduit that in turn leads to the electric motor housing. Air that flows through the air conduit is supplied at least to the region of the commutator of the electric motor. The electric motor housing is provided with an air outlet opening for receiving air that has been supplied to the electric motor housing via the air conduit, with this air outlet opening being in flow communication with an underpressure region of the impeller remote from the pressure-side connection of the impeller housing.

15 Claims, 1 Drawing Sheet

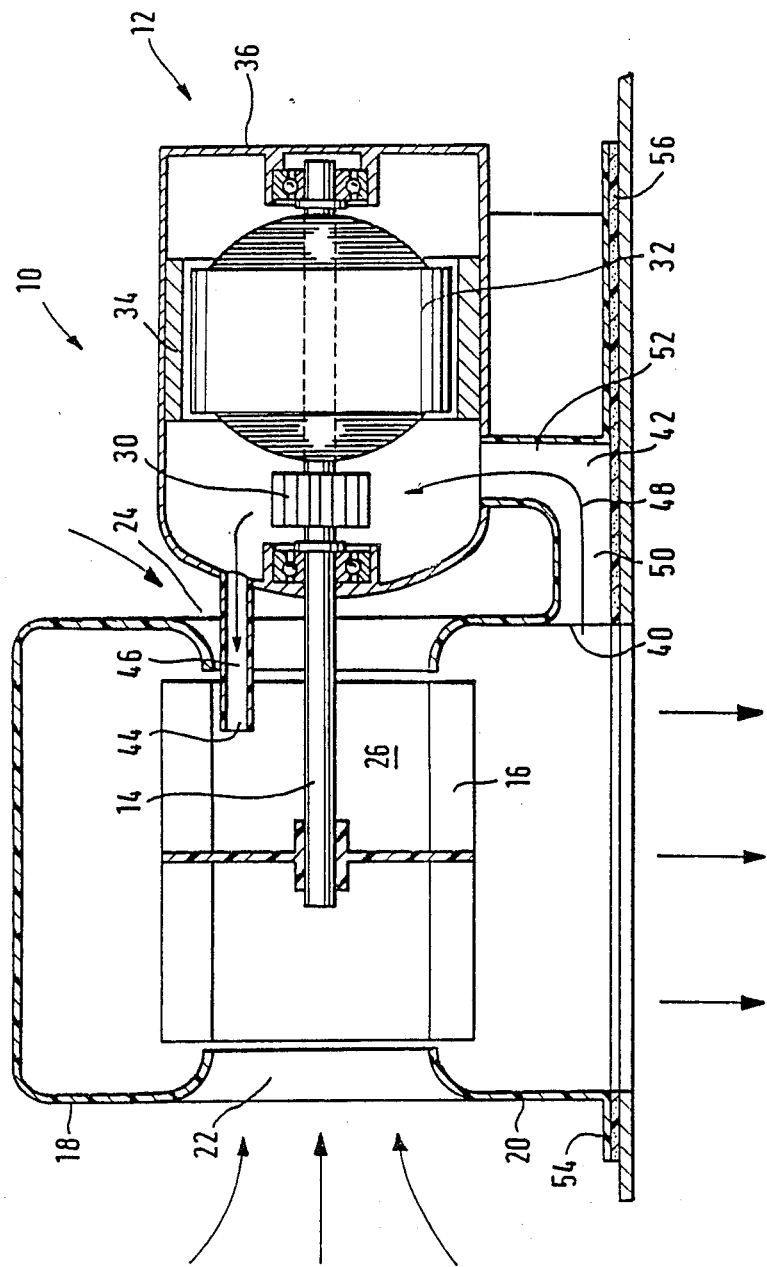

FAN ASSEMBLY

BACKGROUND OF THE INVENTION

The present invention relates to a fan assembly that includes a fan wheel or impeller driven by an electric motor.

The problem with such fan assemblies is that the electric motor must be cooled in a forced manner especially for higher output fans. To accomplish this, it is known to dispose an additional fan wheel on the motor shaft in order to achieve a cooling effect for the electric motor. However, on the one hand this requires additional mechanical expenditure, and on the other hand the efficiency of the fan assembly is impaired because for the small additional fan wheel, which has a relatively poor efficiency, a relatively great amount of drive energy must be used. It is therefore known to provide in the pressure region of the fan, at locations having a small dynamic pressure, intake openings in the forced air flow and to let the air that is drawn in at these locations pass by the electric motor in order to cool the same. However, the quantity of motor cooling air that can be provided in this manner is sufficient only for motors that either have a low output, or that provide for a relatively large pressure build-up and a correspondingly high dynamic differential pressure.

Attempts have therefore been undertaken to dispose in the forced air flow an air-collecting member, and to convey the forced air collected there to the electric motor as cooling air. However, this also greatly impairs the efficiency of the fan, since the air-collecting member not only branches off a portion of the forced air that is generated, but rather above all additional turbulence results that adversely affects the forced air flow.

It is therefore an object of the present invention to provide a fan assembly of the aforementioned general type where the electric motor can be cooled in an energy-favorable manner and independent of assembly.

BRIEF DESCRIPTION OF THE DRAWING

This object, and other objects and advantages of the present invention, will appear more clearly from the following specification in conjunction with the accompanying schematic drawing, which is a longitudinal cross-sectional view through one exemplary embodiment of the inventive fan, to which is flanged an electric motor.

SUMMARY OF THE INVENTION

The fan assembly of the present invention conprises: a housing for the impeller, with this housing having an air intake opening and a pressure-side connection for the discharge of air, with the pressure-side connection being provided with an air inlet opening that communicates with an air conduit that in turn leads to the electric motor housing, with air that flows through the air conduit being supplied at least to the region of the commutator of the electric motor; the electric motor housing is provided with an air outlet opening means for receiving air that has been supplied to the electric motor housing via the air conduit, with the air outlet opening means being in flow communication with an underpressure region of the impeller remote from the pressure-side connection of the impeller housing.

The primary result of disposing the air inlet opening for the air conduit on the pressure-side connection is that the forced air flow is not adversely affected by obstructions, such as an aircollecting member. Pursuant to the present invention, the air inlet opening is provided at a location of the pressure-side connection that has a dynamic overpressure, in other words, at the level of an expansion and in any case not at a narrow location. It is furthermore particularly advantageous to dispose the air outlet opening means for the cooling air flow for the electric motor in the underpressure region of the impeller. In so doing, a cooling air flow that is independent of the overpressure is assured. In other words, although the overpressure that builds up on the pressure side varies as a function of the installation of the inventive fan assembly, the suction underpressure always remains essentially constant. During operation, one generally proceeds on the basis that the intake openings of the fan assembly are exposed, whereas the pressure openings are connected to a forced air channel. In contrast to this normal state, if additional air intake dampers or other flow restrictors are disposed in the intake stream, the suction underpressure at the inlet side of the fan assembly at most increases, so that the suction effect at the air outlet opening means for the motor cooling air is then intensified relative to the normal situation.

Pursuant to one specific embodiment of the present invention, the cross-sectional flow area of the pressure-side connection is greater than that of the fan outlet, and the air inlet opening is disposed in the side wall of the pressure-side connection. In particular, the air inlet opening can be disposed in the side of the pressure-side connection in such a way that there is no undercut or back taper, with the air conduit being embodied as a part that is integrally connected with the pressure-side connection.

A particularly advantageous configuration is where merely the commutator region of the electric motor is supplied with cooling air. It has been shown that this is the region where, due to the formation of sparks, the greatest rise in temperature occurs, so that here is where the greatest need for cooling arises. In contrast, cooling the rotor or stator winding is a minor problem that could, if necessary, be resolved by disposing additional openings in the wall of the electric motor on that side remote from the commutator. Due to the intake and suction arrangement, a distribution of the cooling air flow can easily be adjusted in conformity to requirements, for example by providing small air intake openings for the cooling of the windings and a large intake opening for the cooling of the commutator, with this opening generally also being supplied with forced air from the pressure-side connection of the fan.

Particularly advantageous is the independence of the cooling air flow from the assembly. Even with freely blowing fans, i.e. where the pressure connection is exposed, sufficient cooling air is provided for the motor via the intake line. As a result, the designer of the ventilating system has complete freedom in the configuration of the forced air channel without having to fear cooling problems for the fan motor.

A particular advantage is that by increasing the pressure at the pressure-side connection, the quantity of cooling air that is available increases practically automatically. This means that with an increased power consumption of the electric motor, the cooling effect also increases, so that a greater power range can be covered with one and the same electric motor. The basis for this is that when the pressure increases at the pressure-side connection, i.e. when a greater output is demanded, at the same time the pressure at the air inlet opening also increases, so that the quantity of air that enters at that location, and that is available for cooling, similarly increases. It has furthermore been shown that the return of the motor cooling air that has been heated up by the electric motor into the suction region of the fan, and hence the establishment of an air cycle, is in no way disadvantageous for the cooling, since the quantity of cooling air required is negligible relative to the total quantity of air.

Pursuant to one structurally particularly straightforward embodiment of the present invention, a portion of the air conduit is provided by the sealing member that is already required for the flange of the pressure-side connection of the fan. In particular, the air conduit can be provided in the flange as a U-shape opening that is not undercut, with the missing wall of the air conduit being formed by the sealing member. The air conduit then requires only a short connector to the fan motor housing.

Pursuant to another specific embodiment of the present invention, it is expedient for the air outlet opening means to be part of an air outlet conduit that extends into the region of maximum underpressure on the underpressure side of the impeller. This air outlet conduit can be a hose or other tubular piece, for example of rubber or plastic, that communicates with the electric motor housing in the vicinity of the commutator thereof. If the air conduit is provided to the side next to the commutator in the electric motor housing, the connection for the air outlet conduit can be disposed diagonally opposite the air conduit connection relative to the commutator. The commutator of the electric motor is expediently disposed on that side of the motor that faces the impeller.

The fan can be a radial-flow fan, especially a transverse flow fan, a drum rotor, or an axial rotor, whereby in each case it is advantageous to use the region of maximum underpressure for the air outlet opening means.

A further advantage of the present invention is that the inventive fan assembly is compact and no special features have to be taken into consideration for the assembly; in particular, no exposed openings, the significance of which are unknown to the user of the fan, have to be taken into consideration in any special way with regard to air flow.

Pursuant to another specific embodiment of the present invention, further connection means can be provided for the supply of air at that side of the electric motor that is remote from the commutator. In this connection, the resistance to flow between the further connecting means and the air outlet opening means is considerably greater than the resistance to flow between the connection for the air conduit and the air outlet opening means.

Further specific features of the present invention will be described in detail subsequently.

DESCRIPTION OF PREFERRED EMBODIMENTS

Referring now to the drawing in detail, the fan assembly 10 is provided with an electric motor 12, the shaft 14 of which supports a fan wheel or impeller 16. This impeller is surrounded by a fan housing 18 that is provided with a pressure-side connection 20 via which the forced air generated by the fan assembly is discharged; the fan housing 18 is also provided with two intake openings 22 and 24 that are each disposed in axial alignment with the impeller 16. The fan wheel or impeller 16 is embodied as a drum rotor, so that the interior of the impeller forms a suction chamber 26.

The electric motor 12, which includes a commutator 30, a rotor 32, as well as a stator 34, is surrounded by a housing 36.

Disposed to the side in the pressure-side connection 20 is an air inlet opening 40. An air conduit 42 leads from the air inlet opening 40 to the housing 36 of the electric motor 12.

In addition, an air outlet opening 44 is provided in the suction chamber 26, with the housing 36 of the electric motor 12 communicating with the air outlet opening 44 via an air outlet conduit 46. The air conduit 42 and the air outlet conduit 46 are connected with the housing 36 in such a way that the cooling air flow 48 flows diagonally about the commutator 30 of the electric motor 12.

The air conduit 42 comprises a portion 50 that extends parallel to the axis of the motor, and a portion 52 that extends essentially radially relative to the axis of the motor. The coaxially parallel portion 50 of the air conduit 42 is embodied as an opening in one side of a flange 54 via which the fan assembly 10 is mounted. Furthermore, the flange 54 is covered with a sealing member 56 that can, for example, comprise a 3 mm thick layer of closed-pore foam material. The sealing member 56 extends beyond the axial portion 50 of the air conduit 42, so that as a result of the cooperation of the opening in one side of the flange 54, and the sealing member 56 that covers this flange, a channel is produced that forms the axial portion 50 of the air conduit 42.

The sealing member 56 has preferably already been previously installed, for example by being adhesively mounted to the flange.

Whereas the air conduit 42 is preferably integrally embodied with the flange 54 as a plastic pressure-cast or injection molded part, the air outlet conduit 46 can preferably be a rubber or plastic tube that is held in the housing 36 by being snapped therein.

As an alternative embodiment, the air outlet conduit 46 could be eliminated, and the air outlet opening 44 could be provided as an opening in the wall of the housing 36 of the electric motor 12, for example when sufficient underpressure exists at the so-called motor hood, and the cooling air needs for the electric motor are less.

A particular advantage of the inventive configuration is that an extremely high output can be achieved even with a small motor, where the commutator is cooled relatively slightly, without having to spend a lot of money on production.

As a further alternative, it would also be possible to provide additional openings (not illustrated) in that end wall of the motor housing 36 that is remote from the commutator 30. This then automatically results in a further cooling air flow through the gap between the rotor 32 and the stator 34 to cool the motor windings. This cooling air flow is combined with the cooling air flow 48 in the region of the air outlet conduit 46.

The present invention is, of course, in no way restricted to the specific disclosure of the specification and drawing, but also encompasses any modifications within the scope of the appended claims.

What I claim is:

1. A fan assembly that includes an impeller driven by an electric motor that is disposed in a housing and has a commutator, said fan assembly further comprising:

a housing for said impeller, with said impeller housing having an air intake opening and a pressure-side connection for the discharge of air, with said pressure-side connection being provided with an air inlet opening that communicates with an air conduit that in turn leads to said electric motor housing, with air that flows through said air conduit being supplied at least to the region of said commutator of said electric motor; said electric motor housing is provided with air outlet opening means for receiving air that has been supplied to said electric motor housing via said air conduit, with said air outlet opening means being in flow communication with an underpressure region of said impeller remote from said pressure-side connection of said impeller housing.

2. A fan assembly according to claim 1, in which said pressure-side connection has a cross-sectional flow area that is greater than that of a discharge of said impeller; and in which said air inlet opening is disposed in a side wall of said pressure-side connection.

3. A fan assembly according to claim 1, in which said air inlet opening is disposed in a side of said pressure-side connection in such a way that there is no undercut; and in which said air conduit is integrally embodied with said pressure-side connection.

4. A fan assembly according to claim 1, in which said pressure-side connection is provided with a flange that in an installed state of said fan assembly is convered by a sealing member that then forms part of said air conduit.

5. A fan assembly according to claim 1, in which said air outlet opening means includes an air outlet conduit that extends into a region of maximum underpressure on the underpressure side of said impeller.

6. A fan assembly according to claim 5, in which said air outlet conduit is a rubber hose.

7. A fan assembly according to claim 5, in which said air outlet conduit is a plastic tube.

8. A fan assembly according to claim 5, in which said air conduit is connected to a side of said electric motor housing adjacent said commutator, and said air outlet conduit is connected to said electric motor housing, relative to said commutator, diagonally across from where said air conduit is connected.

9. A fan assembly according to claim 8, in which said commutator is disposed on a side of said electric motor that faces said impeller.

10. A fan assembly according to claim 1, in which said air outlet opening means is disposed in an end wall of said electric motor housing, with said air conduit being connected to a side of said electric motor housing in the immediate vicinity of said end wall thereof.

11. A fan assembly according to claim 1, which includes further air entry means disposed on a side of said electric motor housing remote from said commutator, with resistance to flow between said further air entry means and said air outlet opening means being considerably greater than resistance to flow between said air conduit and said air outlet opening means.

12. A fan assembly according to claim 1, which is a radial-flow fan assembly.

13. A fan assembly according to claim 1, which is a transverse-flow fan assembly.

14. A fan assembly according to claim 1, which is in the form of a drum rotor.

15. A fan assembly according to claim 1, which is in the form of an axial rotor.

* * * * *